(No Model.)
H. CLAAR.
CORN HARVESTER.
No. 519,836. Patented May 15, 1894.
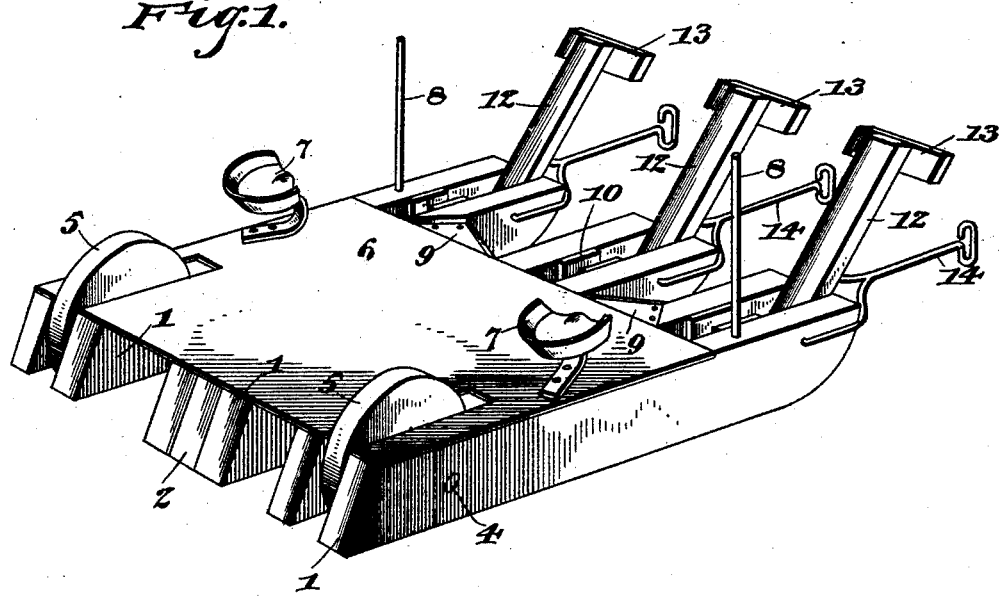
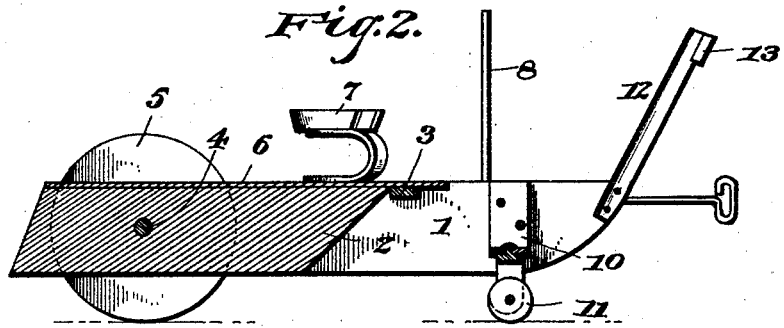
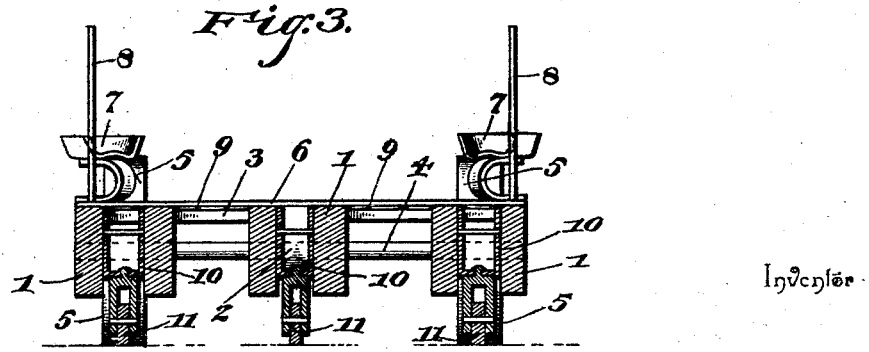
Witnesses
B. S. Ober.
W. S. Duvall.
Inventor
Henry Claar;
By his Attorneys.
C. A. Snow & Co.
THE NATIONAL LITHOGRAPHING COMPANY,
WASHINGTON, D. C.

UNITED STATES PATENT OFFICE.

HENRY CLAAR, OF HAWKEYE, KANSAS.

CORN-HARVESTER.

SPECIFICATION forming part of Letters Patent No. 519,836, dated May 15, 1894.

Application filed December 29, 1893. Serial No. 495,100. (No model.)

*To all whom it may concern:*

Be it known that I, HENRY CLAAR, a citizen of the United States, residing at Hawkeye, in the county of Decatur and State of Kansas, have invented a new and useful Corn-Harvester, of which the following is a specification.

My invention relates to improvements in corn-harvesters, the objects in view being to produce a very simple machine adapted to be drawn by three horses, the draft mechanism being so arranged that the horses will travel between the rows; to adapt the machine to simultaneously operate upon two rows of corn and to so locate the knives as to obviate any accidental cutting of the draft horses or of the attendants.

Other objects and advantages of the invention will appear in the following description, and the novel features thereof will be particularly pointed out in the claims.

Referring to the drawings:—Figure 1 is a perspective view of a corn-harvester embodying my invention. Fig. 2 is a longitudinal sectional view. Fig. 3 is a transverse section.

Like numerals of reference indicate like parts in all the figures of the drawings.

In practicing my invention I employ a series of pairs of beams, in this instance three, and designate the beams of each pair as 1. These beams are rounded toward their front ends so as to adapt them to ride over obstructions and are spaced apart by means of suitable space blocks 2. The pairs of beams are connected by transverse tie-rods 3, and at their rear ends by means of a transverse axle 4, which accommodates a pair of rear ground-wheels 5 that project upward above the beams between which they are located and through openings formed in a superimposed platform 6. This superimposed platform 6 extends from the rear ends of the beams to a point a slight distance beyond the longitudinal center, where it terminates and is bolted at intervals to the beams. The opposite front corners of the platform are occupied by seats 7 for the accommodation of the operators, and in advance of the seats upon the outer beams are vertical posts 8, to which the draft lines or reins may be attached for convenience. Between the outer pair of beams and the inner central pair I locate the inwardly disposed or diagonal cutters 9, which are provided at their ends with the usual beveled edge, adapting them to sever the stalks, and by reason of their inclination or disposition they are adapted to act in a shear-like manner upon the stalks in producing the cuts. Between the beams of each pair adjacent to their front ends I locate and secure U-shaped caster-frames 10, and in each of the same I swivel the shank of a caster-wheel 11. Beyond these at the extreme ends of the beams I locate between each pair an inclined guard 12, the same being forwardly disposed as well as upwardly and having T-ends or heads 13. Between the heads or cross pieces 13 passageways are formed to the knives.

Draft bails 14 embrace and are attached to the front ends of each pair of beams, and to each of these an animal is coupled in any suitable manner.

In operation, the two attendants arrange their reins about the standards 8 and seat themselves upon the seats 7. The machine is drawn along, the horses walking between the rows, and directly in front of the draft bails and the rows of corn pass into the space between the guards and come in contact with the knives or cutters whereby they are severed and fall back into the attendants' arms who cast them upon the platform. When a sufficient quantity has been cut the machine is stopped and the stalks are deposited on the ground to be afterward formed into shocks at a more convenient time.

By arranging the knives between the beams, as shown and not at the outer edges, danger of cutting stock or the attendants is avoided. I also prevent the stock from being cut by reason of the inclined guards at the front ends of the beams which obviate the possibility of the animal's legs getting into the path of the cutter.

From the foregoing description in connection with the accompanying drawings it will be seen that I have provided a machine of light draft, very simple construction, and comprising few parts, and which is capable of simultaneously operating upon two rows of stalks, and which will effectually sever the same; that the attendants remain seated and hence the work is not so tiresome, and that I avoid any possibility of the attendants or the stock from being cut by accident.

Having described my invention, what I claim is—

1. In a corn-harvester, the combination with a series of pairs of beams bolted together, a superimposed platform, cutters located between the pairs of beams a rear axle, ground-wheels thereon, of caster-carrying frames arranged between the beams of each pair near the front ends thereof, draft bails secured to the beams of each pair, and the inclined guards terminating at their upper ends in transverse heads and located between the beams of each pair, substantially as specified.

2. In a corn-harvester, the series of pairs of beams 1 bolted together to form a sled-like structure, cutters located between the pairs of beams, the ground wheels journaled between the beams at the rear end, the series of U-shaped caster frames 10 secured between the beams at the front of the platform 6, and the series of rigid inclined guards 12 also secured between the beams, and provided at their tops with cross pieces, substantially as specified.

In testimony that I claim the foregoing as my own I have hereto affixed my signature in the presence of two witnesses.

HENRY CLAAR.

Witnesses:
JOHN HAYWARD,
W. S. FLEMING.